United States Patent [19]

O'Connor

[11] 4,350,209
[45] Sep. 21, 1982

[54] HYDRAULIC DRAFT CONTROL VALVE

[75] Inventor: John W. O'Connor, Hales Corners, Wis.

[73] Assignee: Allis-Chalmers Corporation, Milwaukee, Wis.

[21] Appl. No.: 270,993

[22] Filed: Jun. 5, 1981

Related U.S. Application Data

[62] Division of Ser. No. 64,097, Aug. 6, 1979, Pat. No. 4,293,040.

[51] Int. Cl.³ .......................................... A01B 63/112
[52] U.S. Cl. .......................................... 172/7; 91/387; 91/461
[58] Field of Search .................. 172/7, 9, 10; 280/405 B, 406 R, 446 R, 446 A; 91/358 R, 368, 387, 461, 512

[56] References Cited

U.S. PATENT DOCUMENTS

| | | | |
|---|---|---|---|
| 3,598,020 | 8/1971 | Blok et al. | 91/461 X |
| 3,954,046 | 5/1976 | Stillhard | 91/461 X |

FOREIGN PATENT DOCUMENTS

| | | | |
|---|---|---|---|
| 1650892 | 12/1970 | Fed. Rep. of Germany | 91/461 |
| 1513281 | 1/1968 | France | 172/7 |
| 1381245 | 1/1975 | United Kingdom | 91/461 |
| 1388938 | 3/1975 | United Kingdom | 91/461 |

*Primary Examiner*—Richard T. Stouffer
*Attorney, Agent, or Firm*—Arthur L. Nelson

[57] ABSTRACT

A hydraulic draft control system for use on a tractor and having a pilot valve regulating flow and pressure for automatically operating a draft control valve. The pilot valve opens and closes in response to draft loads sensed on the tractor to control the opening and closing of the control valve for raising and lowering of an implement on the tractor.

8 Claims, 14 Drawing Figures

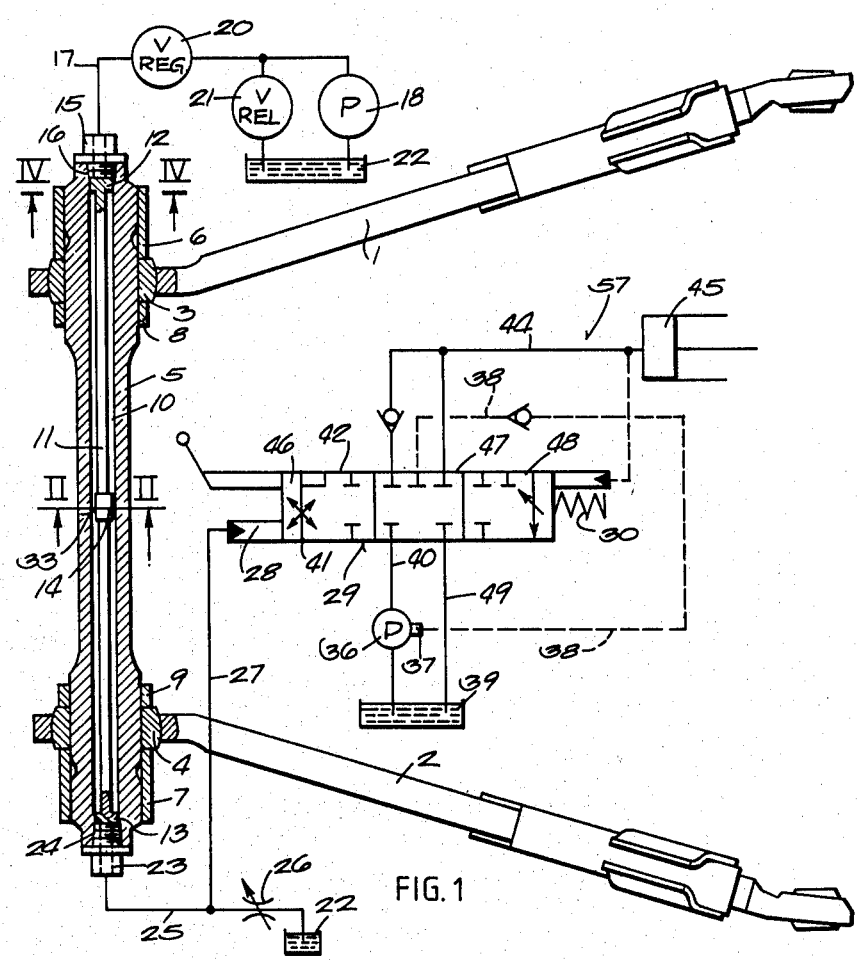
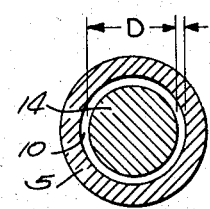
FIG. 2
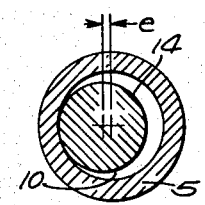
FIG. 3
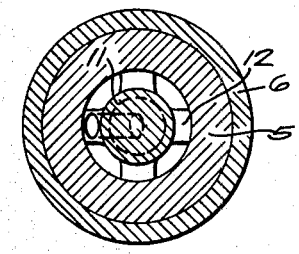
FIG. 4

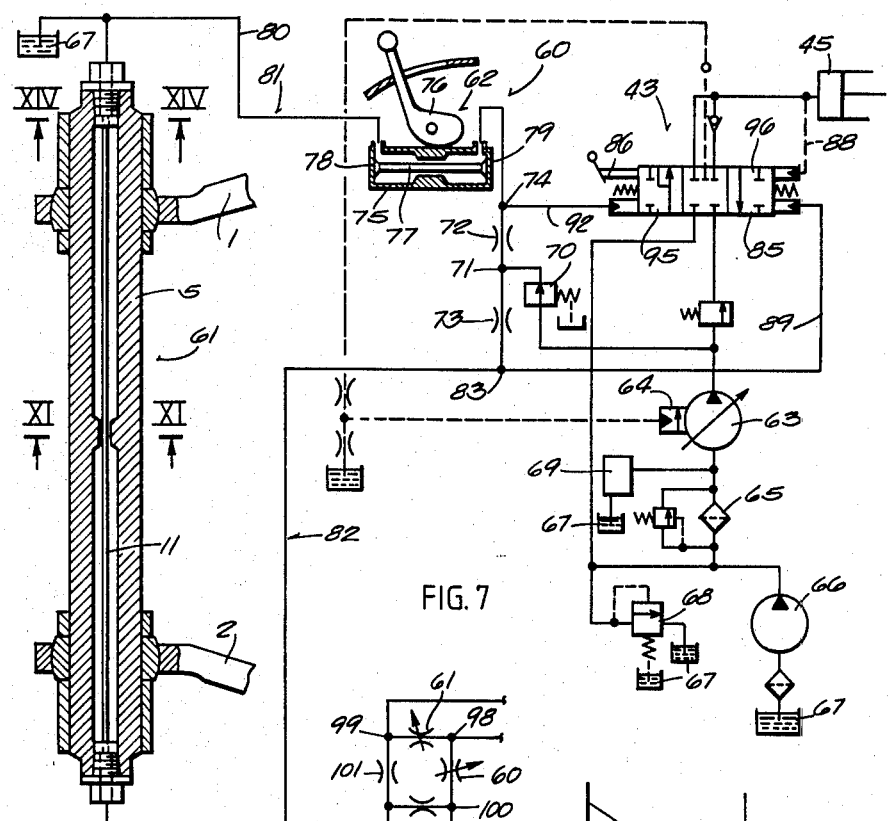
FIG. 7
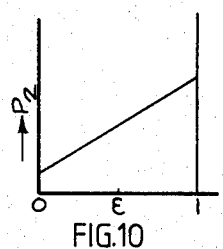
FIG. 8
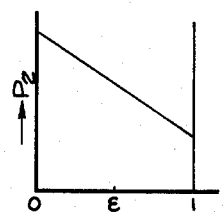
CONTROL PRESSURE
CHARACTERISTICS
FIG. 9
FIG. 10
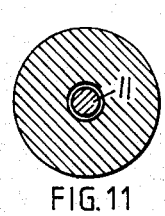
FIG. 11
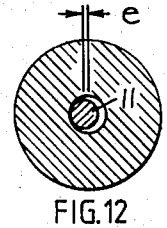
FIG. 12
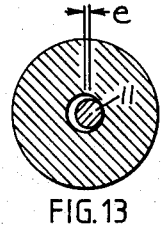
FIG. 13
FIG. 14

HYDRAULIC DRAFT CONTROL VALVE

This is a division of application Ser. No. 064,097, filed Aug. 6, 1979, now U.S. Pat. No. 4,293,040.

This invention relates to a draft control system and more particularly to a pilot valve regulating flow and pressure from a constant pressure source. The pilot valve operating from a constant pressure source allows fluid flow at a rate which is comparable with a flow rate in a manually adjusted variable orifice. The pilot valve and variable orifice may be in series or in parallel. An increased flow produces an increased pressure to raise an implement and a decrease in pressure lowers the implement in a hydraulic draft control system.

Based on the principle that leakage through an eccentric annular space is greater than through a concentric annular space, $$Q = \frac{9,883,102 \ (P_1 - P_2) \ b^3 \ D}{L} (1 + 1.5 \ \epsilon^2).$$

e equals the eccentricity of the central rod within a quill shaft. b equals the normal clearance between the external periphery of the rod and the internal periphery of the quill shaft. $P_1$ and $P_2$ equal the pressure changes across the orifice and L equals the length of the orifice formed by the shaft and the rod. $\epsilon$ equals the eccentricity (e) divided by the normal radial clearance (b).

The deflection of the bending bar from the draft load causes the annular valving space to become eccentric allowing more constant pressure hydraulic fluid to flow through the pilot valve to the pilot piston controlling the draft control valve. Pressure builds up or decreases on a pilot piston of the control valve since the hydraulic fluid flow is limited by a variable orifice and pilot valve to sump. The pre-set level of pilot pressure is adjusted by manually varying the variable orifice.

Draft load sensing systems conventionally used on tractors usually operate by sensing draft loads through deflection of a mechanical linkage. The draft load is usually carried on a bar in bending or in torsion responsive to the draft loads applied to the lower draft arms. The deflection sensed is then amplified through a mechanism to control the hydraulic valve which opens or closes to raise or lower a three-point hitch and the implement thereby varying the draft load.

This invention, however, eliminates the need for a mechanical device for amplifying the deflection sensed on the bar in bending or the torsion bar. An auxiliary hydraulic system is provided in which a constant pressure source of pressurized fluid supplies fluid flowing through the pilot valve which is connected to the draft control valve and varies the rate of flow responsive to the draft load on the tractor. The fluid flow from the pilot valve normally discharges through a manually adjustable variable orifice into the sump. With an increase in flow an increase in pressure is produced which in turn operates the control valve in a hydraulic draft load system which raises the implement and vice versa. The control valve operates responsive to draft loads. A modification provides variable orifices in a bridge circuit with comparitive pressures across the bridge circuit operating the control valve.

It is an object of this invention to provide a hydraulic draft load sensing system having a pilot valve operating responsive to draft loads for varying the pressure to operate a control valve to raise and lower the implement.

It is another object of this invention to provide a hydraulic draft load sensing system having an auxiliary circuit with a constant pressure source and pilot valve varying the fluid flow responsive to draft loads to vary the pressure in a pressure chamber operating the control valve to raise and lower the implement responsive to draft loads.

It is a further object of this invention to provide a hydraulic draft load sensing system including an auxiliary circuit having a constant pressure source and a pilot valve varying the flow rate responsive to draft loads and a variable orifice discharging hydraulic fluid to sump. The pressure in the system between the pilot valve and the variable orifice is varied in response to the draft load to operate a control valve for raising and lowering of the implement.

It is a further object of this invention to provide a hydraulic bridge circuit having two flow paths connected to a source of constant pressure hydraulic fluid with a manually adjustable orifice and a draft load sensing orifice to control the pressure differential in the flow paths of the bridge circuit. Differential variations in pressure, responsive to draft loads, operates a control valve to raise and lower the implement responsive to the draft loads.

It is a further object of this invention to provide a fixed orifice and a variable orifice in each of two flow paths of a hydraulic bridge circuit with one of the variable orifices, a manually adjustable variable orifice to pre-set the pressure level in one flow paths of the bridge circuit and the other variable orifice operating responsive to draft loads to vary the pressure sensed in the other flow path of the bridge circuit to provide control pressures for operating a control valve of the hydraulic draft load sensing system.

The objects of this invention are accomplished by providing a hydraulic draft load sensing system having a hydraulic circuit with a constant pressure source of pressurized fluid, a pilot valve and a manually adjustable variable orifice. A pressure operated control valve having a pressure chamber with pressurized fluid from the hydraulic circuit opens and closes the control valve to operate hydraulic rams to raise and lower the implement connected to the draft vehicle responsive to pressure variation in the load sensed. Normally hydraulic fluid flows through the pilot valve and variable orifice and discharges to sump maintained at a relatively constant pressure on the hydraulic pressure operated control valve. As the flow rate increases through the pilot valve the pressure downstream from the pilot valve increases which in turn increases the pressure on the control valve to open the valve and raise the implement. With the decrease in flow rate the pressure downstream from the pilot valve decreases allowing a spring to return the control valve to lower the implement. Accordingly, the draft load sensing system operates the control valve in the hydraulic load sensing system responsive to draft loads on the draft vehicle.

A modification of the hydraulic load sensing system provides a bridge circuit in which a fixed orifice and a manually adjustable orifice are connected in series in one leg of a hydraulic bridge circuit. The manually adjustable orifice provides calibration for the pressure level in the hydraulic circuit. The other leg of the hydraulic bridge circuit includes a fixed orifice and a variable orifice which varies in response to draft loads. The second leg of the bridge circuit includes a variable orifice formed by the pilot valve in the draft load system. The pilot valve varies the flow of pressurized fluid and pressure responsive to the draft loads and this pressure is used to operate a control valve to supply pressurized fluid to a lift ram to raise and lower the implement responsive to draft loads.

Referring to the drawings, the preferred embodiment of this invention is illustrated.

FIG. 1 illustrates a cross-section view of a bar in bending and the lower draft arms of a three-point hitch together with a hydraulic load sensing system;

FIG. 2 illustrates a cross-section view taken on line II—II of FIG. 1;

FIG. 3 is a cross-section view taken on line II—II of FIG. 1 wherein the quill shaft is used as a bar and deflected due to loading on the lower draft arms;

FIG. 4 illustrates a cross-section view taken on line IV—IV of FIG. 1 showing one of the end abutments;

FIG. 7 illustrates a schematic diagram of the hydraulic bridge circuit with a manually adjustable variable orifice to pre-set the pressure level in the hydraulic system and a pilot valve in the other leg of the hydraulic bridge circuit operating responsive to draft loads of the vehicle;

FIG. 8 illustrates a modification of the bridge circuit in which the variable orifices are adjacent the constant pressure source of hydraulic fluid;

FIG. 9 illustrates the pressure variation sensed as a function of the eccentricity of the pilot valve of the circuit shown in FIG. 7;

FIG. 10 illustrates pressure variations sensed as a function of the eccentricity of the pilot valve of the bridge circuit shown in FIG. 8;

FIG. 11 illustrates a cross-section view of the pilot valve with a rod centered in the quill shaft under no-load conditions;

FIG. 12 illustrates maximum eccentricity of the pilot valve responsive to maximum positive sensed load;

FIG. 13 illustrates a cross-section view of the pilot valve under maximum negative load; and FIG. 14 illustrates a cross-section view taken on line XIV—XIV of FIG. 7.

Figure 5:
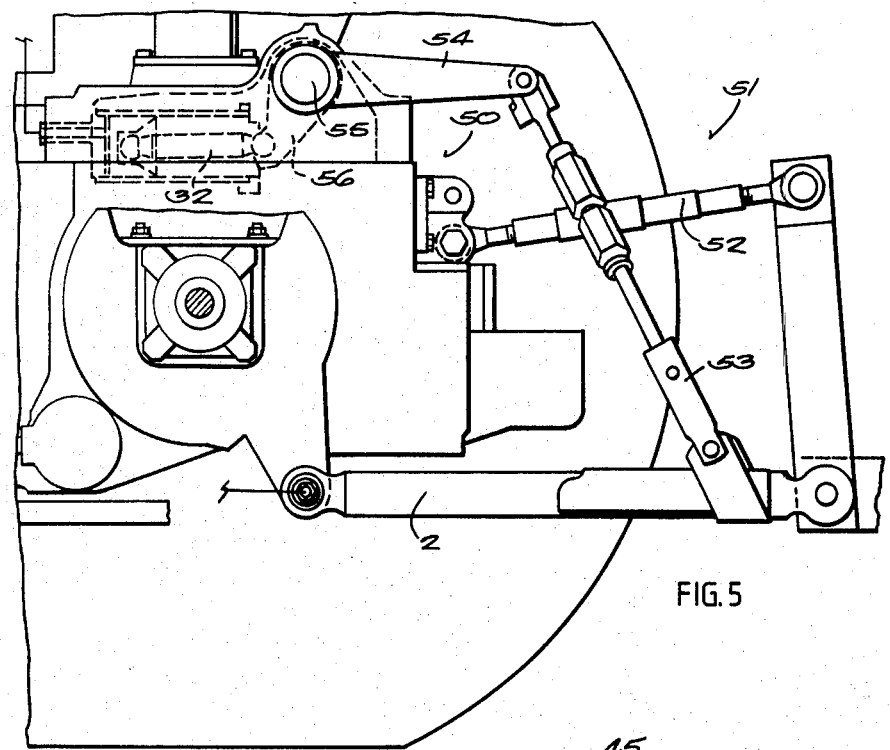
FIG. 5 is a side elevation view of a draft vehicle showing a three-point hitch for connecting the load sensing system.
Figure 6:
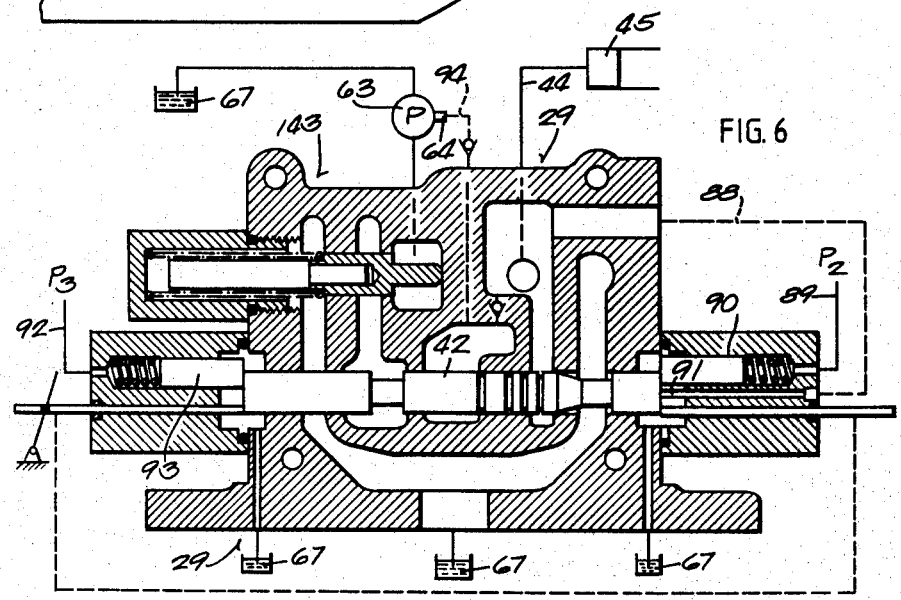
FIG. 6 is a section view of a control valve hydraulically operated responsive to the load sensing system.

Referring to the drawings, FIG. 1 shows the lower draft arms 1 and 2 connected through the spherical bushings 3 and 4 to the quill shaft 5 forming a bar in bending. The quill shaft 5 is supported on the chassis by the sleeves 6 and 7. Retainers 8 and 9 hold the spherical bushings 3 and 4 axially in the position as shown. The quill shaft 5 forms the central passage 10 for transmitting pressurized fluid. The rod 11 is supported at each end by the abutments 12 and 13 coaxially with central passage 10. The enlargement 14 forms a valve element axially centered in the quill shaft 5. The enlargement 14 is of a smaller diameter than the internal diameter of the passage 10 to allow fluid to flow through the passage 10.

A fitting 15 threadedly engages the threaded opening 16 in the right-hand end of the quill shaft 5 to supply fluid from the conduit 17 which is connected to the constant pressure pump 18. Constant pressure pump supplies constant pressure fluid through the pressure regulator valve 20. Relief valve 21 is connected between the pump output and sump 22.

The fitting 23 is fastened in a threaded opening 24 on the left-hand end of the quill shaft 5 and connects the passage 10 to the conduit 25. The conduit 25 is connected through the variable orifice 26 to sump 22. The conduit 27 is connected to a hydraulic pressure chamber 28 operating the control valve 29. The spring 30 biases the control valve against the hydraulic pressure in chamber 28. The presure in the hydraulic pressure chamber 28 varies in accordance with the rate of flow through the pilot valve 33 and the variable orifice 26 which increases and decreases the pressure in the conduit 27.

FIG. 2 shows the enlargement 14 in the quill shaft in the concentric position within the passage 10.

FIG. 3 shows the full load condition in which the enlargement 14 is eccentric within the passage 10 of the quill shaft 5 and maximum flow is permitted through the passage 10.

FIG. 4 shows the abutment 12 in the quill shaft 5 centrally mounting the rod 11. The passage in the rod 11 permits fluid passage from conduit 10.

A variable volume pump 36 is fitted with a compensator 37 sensing load pressure through the sensing passage 38 in the control valve 29. The variable volume pump 36 receives fluid from the sump 39. Pressurized fluid is discharged through conduit 40 and passage 41 in the control valve 29. The spool 42 reciprocates within the valve housing 143 to selectively supply pressurized fluid in the conduit 44 to the pressurized chamber 45 in the hydraulic ram 32. The section 46 of the control valve 29 supplies pressurized fluid to the sensing passage 38 and to the supply passage 44 to the ram 45, when this section is in the operating position. The section 47 is the neutral position for the valve. The section 48 provides return of fluid from the ram 45 to return the fluid to sump through the return conduit 49.

FIG. 5 shows a tractor 50 with a three-point hitch 51 including an upper link 52. The lower draft arms 1 and 2 are universally connected to the tractor. The lift link 53 is connected to the lower draft arm 2 and the rock arm 54 which is supported on rock shaft 55. The hydraulic ram 45 operates the rock shaft 55 through the lever 56. The hydraulic ram 45 is shown in the weight transfer system 57.

Referring to FIG. 7 the bridge circuit 60 is shown for sensing draft load through the pilot valve 61. Manually adjustable variable orifice 62 pre-sets the pressure level in the bridge circuit. A constant source of pressurized fluid is provided by the pump 63 having a load-sensing compensator 64 for stroking and destroking the pump. The pump 63 receives fluid through the filter 65 and the charging pump 66 connected to the sump 67. Relief valve 68 returns fluid to the reservoir 67. Relief valve 69 is also positioned on the inlet side of the pump 63 returns the fluid to the reservoir 67. Pressure regulator valve 70 is in communication with discharge side of the pump 63 and maintains a constant pressure level at the junction 71.

The constant pressure junction 71 supplies pressurized fluid through the fixed orifices 72 and 73 of the two legs 80 and 82 of the bridge circuit. The orifice 72 is connected through connection 74 to the manually variable orifice 62. The manually adjustable variable orifice 62 includes a tubular member 75 which is biased to an eccentric position by the cam 76 manually. A central rod 77 is fixed to the end plates 78 and 79 and normally held in a concentric position with the orifice. The conduit 80 discharges fluid into the sump 67. The leg 81 of the bridge circuit is connected in parallel with the leg 82. The leg 82 includes the fixed orifice 73 and the junction 83 which is connected between the fixed orifice 73 and the pilot valve 61. The pilot valve 61 sensing draft loads in a manner similar to that shown in FIG. 1. The draft arms 1 and 2 and the quill shaft 5 with the rod 11 forming pilot valve 61 operates in the manner as previously described for the draft load sensing as described in FIG. 1.

The ram 45 operates to lift and lower the implement as described in FIG. 1. The control valve 85 operates in a slightly different manner since differential pressures are used to operate the valve. The manual control 86 can selectively position the valve in one of the three positions. The neutral position is shown in FIG. 7. Fluid pressure conduits leading to and from the valve for operating the valve include conduit 88 which is connected to the load pressure applied to the ram 45. Conduit 89 is connected to the junction 83 between the fixed orifice 73 and the pilot valve 61. The conduit 89 operates against the plunger 90 to bias the spool 42 in the left-hand direction. Conduit 88 operates against the piston 91 to also bias the spool 42 in the left-hand direction.

Conduit 92 is connected to the junction 74 which is intermediate the fixed orifice 72 and the manually adjustable variable orifice 62. The pressure sensed at the junction 74 is supplied to the conduit 92 and biases the piston 93 in the right direction against the spool 42. The opposing forces produced by the pressure differential at the junctions 83 and 74 control the movement of the spool. The reaction force of the plunger 91 is also applied to the spool to control its movement in supplying pressurized fluid to the ram 45 to raise or lower the implement. The pump 63 is a load sensitive pump and the load is sensed through the sensing passage 94 connected to the compensator 64 to stroke and destroke the pump responsive to the load pressure.

The three positions of the control valve are essentially to raise the implement through supplying pressurized fluid through section 95 of the control valve 43 to the lower implement through section 96 as pressurized fluid is vented to sump. The valve 43 is shown in the neutral position in which there is no communication between the pump and the ram or the ram and sump and the fluid flow is interrupted.

FIG. 8 illustrates the reverse positioning of the variable orifices and the fixed orifices whereby the variable orifices are connected by a junction 98 to the constant pressure source of hydraulic fluid. A reversal of pressure changes on the pressure sensing terminals 99 and 100 is produced for controlling the movement of the spool of the control valve. The pressure variable applied to the spool valve from the junction 83 between the fixed and variable orifices is shown in FIG. 9. The reverse situation is shown where the pressure at the junction 99 is shown in FIG. 10 where the pressure varies reversely from that shown in FIG. 9.

The eccentricity of the rod in the pilot valve 61 is shown in FIGS. 11, 12 and 13. FIG. 11 shows the neutral position in which no load is applied to the vehicle. FIG. 12 shows a maximum positive draft load applied to vehicle, while FIG. 13 shows the maximum negative load applied to the vehicle. A maximum eccentricity of the pilot valve allows maximum flow through the pilot valve.

FIG. 14 shows the mounting in the end of the rod 11 in the support for the quill shaft 5 and rod 11. Passage is provided through the ends of the quill shaft to allow the fluid to flow through the quill shaft and the pilot valve.

The operation of the system will be described in the following paragraphs.

The constant pressure pump 18 supplies pressurized fluid to the regulator valve 20 which regulates the pressure of hydraulic fluid in the conduit 17. Fluid is supplied through the fitting 15 to the quill shaft 5 which flows through the passage 10 and pilot valve 33. The variable orifice 26 is adjusted to the relatively constant flow through the pilot valve to sump 22. This in turn produces a relatively constant pressure condition in the hydraulic pressure chamber 28. As the eccentricity of the pilot valve becomes greater, the rate of flow increases and the pressure in conduit 27 increases. This in turn causes spool 42 to be displaced in the right-hand direction opening the pump passage 40 to the passage 44 and the hydraulic ram 32. With the flow of pressurized fluid to the ram 32 the ram lifts the implement which reduces the draft load on the tractor. With the decrease in draft load on the tractor, the pilot valve 33 moves to a more concentric position and the flow rate is decreased in the passage 10. The decrease in flow rate in passage 10 decreases the pressure in the conduit 27 and pressure chamber 28 and the spring 30 biases the spool 42 in the left-hand direction to interrupt the flow through the control valve 29 to pressurizing chamber 45 of the ram 32. Hydraulic fluid is then discharged through the control valve 29 to sump 39. This in turn allows the implement to lower and increases the draft load on the tractor.

FIG. 7 illustrates a bridge circuit which compensates for viscosity changes due to temperature changes which are inherent in a hydraulic system. The manually adjusted variable orifice 62 is adjustable by the cams 76. The setting of the cam 76 determines the pressure at the junction 74. The flow rate through the leg 81 is calibrated to provide the desired pressure at the junction 74. The pilot valve 61 operates as previously described in FIG. 1. The junction 83 will vary in response to draft loads. The pressures of the junctions 74 and 83 are connected to opposing sides of the spool 42. As the eccentricity of the pilot valve increases, the pressure of the junction 83 decreases since the hydraulic fluid flows through the pilot more readily than when the pilot valve is concentric, as shown in FIG. 11. As a pressure on the junction 83 and conduit 89 decreases, the pressure on the plunger 90 also decreases. Simultaneously, the pressure on the junction 74 and conduit 92 in communication with the plunger 93 remains constant while the pressure decreases on the opposing side of the spool 42. The spool is then moved in the right-hand direction. Variations in pressure across the bridge being imposed across the spool cause it to move in response to the changes in the eccentricity of the pilot valve 61.

FIG. 10 illustrates the positioning of the variable orifices at the high pressure end of the bridge circuit and fixed orifices at the low pressure side of the bridge circuit. In the connection, as shown in FIG. 8, the reverse pressure situation at junction 99 exists since the pressure between the pilot valve 61 and the fixed orifice 101 will increase as the flow rate through the pilot valve increases. It is the relative pressure between the two junctions which determines the position of the valve. The relative pressures at these junctions are determined by the eccentricity as originally set on the variable orifice 60 during clabiration and the subsequent eccentricity of the pilot valve due to response of the draft load.

The embodiment of the invention in which an exclusive property or privilege is claimed are defined as follows:

1. A hydraulic draft load sensing system on a vehicle comprising a source of constant pressure hydraulic fluid, a hydraulic bridge circuit having two flow paths connected to said source of constant pressure hydraulic fluid, each of said flow paths including a variable orifice and a fixed orifice connected by a fluid junction, one of said variable orifices defining a load sensing hydraulic valve, a control valve adapted for controlling fluid flow to a hydraulic actuator, a hydraulic valve operator connected to at least one of said junctions for operating said control valve responsive to pressure changes in at least one of said junctions, a draft coupling including a three point hitch connected to said load sensing valve for controlling the rate of flow responsive to draft loads for operating said control valve.

2. A draft load sensing system on a vehicle as set forth in claim 1, wherein the other of said variable orifices include manual means for varying the flow rate through said orifice.

3. A hydraulic draft load sensing system as set forth in claim 1 including a second hydraulic valve operator connected to said control valve, said junctions connected to opposing sides of said control valve.

4. A hydraulic load sensing system as set forth in claim 1 including means supporting said draft load sensing valve permitting eccentric movement of said valve in at least two directions, said draft coupling connected for moving said load sensing valve in at least two directions.

5. A hydraulic draft load sensing system on a vehicle as set forth in claim 1, wherein said other variable orifice includes a deformable tubular structure receiving a central rod forming passage means and adjustable orifice, a manually operated cam for eccentrically biasing said tubular structure to adjustably control the eccentricity of said rod in said tubular structure.

6. A draft load sensing system on a vehicle as set forth in claim 1, wherein each of said flow paths include a fixed orifice adjacent said source of constant pressure hydraulic fluid, each of said variable orifices positioned downstream from said fixed orifice to form said junction.

7. A hydraulic draft load sensing system on a vehicle as set forth in claim 1 wherein each of said flow paths include a variable orifice connected in said flow path adjacent said source of constant pressure hydraulic fluid, a fixed orifice in each of said flow paths downstream from said variable orifice to form said junction intermediate said orifices.

8. A hydraulic draft load sensing system on a vehicle as set forth in claim 1, wherein said load sensing valve includes a quill shaft mounted on said vehicle, a rod extending concentrically within said quill shaft and mounted on said vehicle, said draft coupling defining a load carrying draft arm of said three points hitch connected intermediate said load sensing valve and said support for said quill shaft.

* * * * *